United States Patent [19]

Ragland et al.

[11] Patent Number: 6,036,997
[45] Date of Patent: Mar. 14, 2000

[54] PRESSURE SENSITIVE ADHESIVE LAMINATE

[75] Inventors: G. William Ragland, Dunwoody, Ga.; Boyd A. Barnard, St. Louis, Mo.

[73] Assignee: ATD Corporation, Norcross, Ga.

[21] Appl. No.: 08/505,904

[22] Filed: Jul. 24, 1995

Related U.S. Application Data

[63] Continuation of application No. 07/817,944, Jan. 3, 1992, abandoned, which is a continuation of application No. 07/349,009, May 8, 1989, abandoned.

[51] Int. Cl.⁷ .................................................. B05D 5/10
[52] U.S. Cl. ............................. 427/208.4; 427/208.8; 428/317.3; 428/353; 428/354
[58] Field of Search ..................... 428/317.3, 318.4, 428/319.3, 353, 354, 424.2, 424.4, 425.5; 427/208.4, 208.8

[56] References Cited

U.S. PATENT DOCUMENTS

| | | |
|---|---|---|
| 2,557,786 | 6/1951 | Johannson . |
| 2,882,183 | 4/1959 | Bond et al. . |
| 3,023,126 | 2/1962 | Underwood ........................ 428/424.2 |
| 3,179,546 | 4/1965 | Fischer . |
| 3,198,692 | 8/1965 | Bridgeford ........................ 428/424.2 |
| 3,228,820 | 1/1966 | Samson . |
| 3,453,136 | 7/1969 | Bylsma . |
| 3,453,243 | 7/1969 | Hartlein . |
| 3,502,704 | 3/1970 | McKellar . |
| 3,542,639 | 11/1970 | Manio . |
| 3,624,022 | 11/1971 | Ross . |
| 3,707,521 | 12/1972 | De Santis . |
| 3,779,794 | 12/1973 | De Santis . |
| 3,971,883 | 7/1976 | Meeks et al. . |
| 4,031,120 | 6/1977 | Gervase . |
| 4,169,184 | 9/1979 | Pufahl . |
| 4,196,254 | 4/1980 | Puskadi . |
| 4,232,489 | 11/1980 | Corvington et al. . |
| 4,284,751 | 8/1981 | Hutt et al. . |
| 4,308,071 | 12/1981 | Gervase . |
| 4,312,693 | 1/1982 | Salensky ........................ 428/425.5 |
| 4,356,676 | 11/1982 | Hauptman . |
| 4,468,492 | 8/1984 | Piccirilli et al. . |
| 4,507,447 | 3/1985 | Yamazaki et al. . |
| 4,534,815 | 8/1985 | Hamada et al. . |
| 4,539,345 | 9/1985 | Hansen . |
| 4,551,541 | 11/1985 | Hanisch . |
| 4,567,106 | 1/1986 | Sano et al. . |
| 4,567,228 | 1/1986 | Gaa et al. . |
| 4,569,961 | 2/1986 | Oezelli et al. . |
| 4,582,873 | 4/1986 | Gaa et al. . |
| 4,598,131 | 7/1986 | Prucnal . |
| 4,618,389 | 10/1986 | Agodoa . |
| 4,625,012 | 11/1986 | Rizk et al. . |
| 4,628,076 | 12/1986 | Chang et al. . |
| 4,675,232 | 6/1987 | Edenbaum et al. . |
| 4,680,233 | 7/1987 | Camin et al. . |
| 4,681,808 | 7/1987 | Lefler, III . |
| 4,687,533 | 8/1987 | Rizk et al. . |
| 4,694,093 | 9/1987 | Sugimori et al. . |
| 4,726,982 | 2/1988 | Traynor et al. . |
| 4,728,567 | 3/1988 | Razzano et al. . |
| 4,740,416 | 4/1988 | DeCoste, Jr. et al. . |
| 4,749,741 | 6/1988 | Saito et al. . |
| 4,948,450 | 8/1990 | Hurter ..................................... 428/353 |

FOREIGN PATENT DOCUMENTS

| | | |
|---|---|---|
| 78102213 | 3/1979 | China . |
| 78108571 | 7/1979 | China . |
| 194872 | 12/1986 | European Pat. Off. . |
| 3621885 A1 | 6/1986 | Germany . |
| 3560485 | 9/1987 | Germany . |
| 56-109272 | 8/1981 | Japan . |
| 57-183753 | 11/1982 | Japan . |
| 58-171429 | 10/1983 | Japan . |
| 58-171430 | 10/1983 | Japan . |
| 59-113076 | 6/1984 | Japan . |
| 60-120045 | 6/1985 | Japan . |
| 61-275324 | 12/1986 | Japan . |
| 62-4728 | 1/1987 | Japan . |
| 62-53337 | 3/1987 | Japan . |
| 63-17983 | 1/1988 | Japan . |
| 63-46212 | 2/1988 | Japan . |

*Primary Examiner*—Jenna Davis
*Attorney, Agent, or Firm*—Burns, Doane, Swecker & Mathis, LLP

[57] ABSTRACT

This invention relates to improved polymer-pressure sensitive adhesive combinations, particularly in the form of laminates, and methods of producing same. This invention improves the bond strength of the pressure sensitive adhesive to the polymer layer by priming the polymer surface with a curable urethane primer before applying the pressure sensitive adhesive to the polymer surface. If the polymer surface is not "active" to the curable urethane primer, the polymer surface is first activated with a silicon-containing treating agent. The laminates of this invention have superior bond strength, especially longterm bond strength. Of particular interest are the embodiments of this invention wherein the polymer is a silicone foam and the pressure sensitive adhesive is either acrylic or silicone adhesive.

12 Claims, No Drawings

PRESSURE SENSITIVE ADHESIVE LAMINATE

This application is a continuation of application Ser. No. 07/817,944, filed Jan. 3, 1992 now abandoned, which is a continuation of Ser. No. 07/349,009, filed May 8, 1989, now abandoned.

FIELD OF THE INVENTION

This invention relates to laminates comprising polymeric materials and pressure sensitive adhesives, such as a silicone foam sheet laminated with a silicone or acrylic pressure sensitive adhesive.

BACKGROUND OF THE INVENTION

Polymeric materials, particularly elastomeric sheets, with a pressure sensitive adhesive laminated on at least one surface thereof have a great many industrial and consumer uses, including insulation, vibration damping and sound proofing. When cut into strips, the laminates find additional uses in sealing between surfaces in such uses as gaskets and weather stripping. One group of such polymeric materials referred to herein in order to describe and illustrate the present invention is elastomeric foams. Examples of elastomers are disclosed in U.S. Pat. No. 2,882,183 to Bond et al. and U.S. Pat. No. 4,169,184 to Pufahl, the disclosures of which are incorporated herein by reference.

The elastomeric sheets laminated with pressure sensitive adhesive are most useful when the pressure sensitive adhesive bonds to the elastomeric sheet with a greater bond strength than the pressure sensitive adhesive will bond to other substrates on which the laminate is applied. In other words, it is desired that when it is attempted to remove the elastomeric sheet from the substrate to which it has been applied with the pressure sensitive adhesive, the failure mode upon removal is preferably the cohesive failure of the elastomeric sheet and not the adhesive failure between the elastomeric sheet and pressure sensitive adhesive. This desired characteristic of elastomeric sheet/pressure sensitive adhesive laminates has not been achieved in the most part, particularly with respect to silicone foam elastomeric sheets and other elastomeric sheets on which it is difficult to obtain a satisfactory bond between the surface of the elastomeric sheet and the pressure sensitive adhesive. For example, U.S. Pat. No. 4,728,567 to Razzano, et al., incorporated herein by reference, discloses that a satisfactory bond strength between an acrylic pressure sensitive adhesive and a pre-cured foamed silicone sheet cannot be obtained. Therefore, it is disclosed in this patent that the silicone foam should be cast on and cured in contact with the plastic or metal film or the pressure sensitive adhesive in order to obtain the desired bond strength between the pressure sensitive adhesive and the surface of the foam silicone foam sheet after it has cured.

However, it may be undesirable in some instances to be restricted to manufacturing the desired elastomeric sheet/pressure sensitive adhesive laminates by casting the uncured elastomer onto the pressure sensitive adhesive layer and curing the elastomer in place on the pressure sensitive adhesive layer. It is commercially desirable to use more conventional manufacturing methods which comprise using a pre-manufactured elastomeric sheet, which is supplied in roll form to a laminator. The laminator then feeds the elastomeric sheet from the roll to a laminating process together with a preformed pressure sensitive adhesive layer on a release paper, also supplied in roll form. The elastomeric sheet and pressure sensitive adhesive are laminated by rolling them between rollers, with some heat, if desired, to form the laminate of the elastomeric sheet and the pressure sensitive adhesive. Since the pressure sensitive adhesive layer has a release paper on one side of the pressure sensitive adhesive, the laminate thus formed can then be rolled up in a roll for future use. If desired, the sheet can be slit into strips before or after rolling in order to form individual reels of laminate strips. The laminate can then be used as a self-adhering tape by removing the release paper from the pressure sensitive adhesive side and applying the adhesive side of the laminate strip to the desired substrate surface.

Therefore, it is an object of this invention to provide desired elastomeric sheet/pressure sensitive adhesive laminates having the desired bond strength between the sheet and adhesive, as described above. It is a further object of this invention to provide such laminates which can be manufactured in conventional laminating processes.

SUMMARY OF THE INVENTION

In one aspect, this invention is a laminate comprising a polymeric layer having an active surface, a coating of a curable urethane primer on said surface and a pressure sensitive adhesive applied to the coated surface. In another aspect, this invention includes a method of forming such a laminate by applying to an active surface of the polymeric layer a coating of a curable urethane primer, then applying to the coated surface a layer of a pressure sensitive adhesive.

In another aspect, this invention is a laminate comprising a polymeric layer having an active surface and a coating of a curable urethane primer on said surface. Preferably the curable urethane primer comprises a urethane film used in sheet form. In a related aspect, this invention includes the method of forming such a laminate by applying to an active surface of the polymeric layer a coating of a curable urethane primer.

In another aspect, this invention is a laminate comprising a polymeric layer having a cured or inactive surface activated with a first coating of a silicon treating agent, a second coating of a curable urethane primer on said activated surface and a pressure sensitive adhesive applied to the urethane primer coated surface. In a related aspect, this invention includes a method of forming such a laminate by applying to a cured or inactive surface of the polymeric layer a coating of a silicon treating agent to activate said surface; applying to the activated surface a coating of a curable urethane primer; and applying to the urethane primer coated surface a layer of a pressure sensitive adhesive.

In yet another aspect, this invention provides a laminate comprising a polymeric layer having a cured or inactive surface that is activated with a coating of a silicon treating agent and a protective film applied to the activated surface whereby the activated surface is protected from deactivation. In a related aspect this invention includes the process of forming such a laminate by applying to a cured or inactive surface of the polymeric layer a coating of a silicon treating agent to activate said surface and applying to the activated surface a protective film to protect the activated surface from deactivation.

In still another aspect, this invention provides a laminate comprising a polymeric layer having a cured or inactive surface activated with a coating of a silicon treating agent and a coating of a curable urethane primer on said activated surface. The invention also provides the related process of forming such a laminate. In this aspect, a preferred curable urethane primer is a solid urethane used in film or sheet form, laminated to the activated surface to provide the coating thereon of the curable urethane primer.

In another aspect this invention provides a method of forming a laminate comprising a polymeric layer and a curable urethane primer comprising casting a liquid polymer on a sheet of curable urethane primer in the form of a film and allowing the polymer to cure to form the polymeric layer on the urethane film or sheet.

DESCRIPTION OF THE INVENTION

Among other factors and elements, this invention is in part based upon the realization that the bond strength between a polymeric surface, such as an elastomeric sheet, and a pressure sensitive adhesive can be enhanced if the surface of the polymeric material or elastomeric sheet is "active", as defined herein, or is made "active" before the pressure sensitive adhesive is applied to the surface. This bond strength is enhanced according to the present invention by applying a curable urethane primer to the active surface before the pressure sensitive adhesive is laminated to the surface. Following the disclosure set forth herein, one can determine if a polymeric surface is active for use in this invention and can make an inactive surface active for use in this invention by following the descriptions and teachings herein.

In one particular application, this invention provides a solution to the long-existing problem of inadequate bond strength that results from conventional lamination of a layer of a pressure sensitive adhesive to a cast or extruded silicone foam sheet. It is desirable to have a bond strength between the silicone foam and the pressure sensitive adhesive such that the failure mode upon removal from the substrate is first the cohesive failure of the foam itself or second is the adhesive failure of the pressure sensitive adhesive from the substrate on which it is placed, but is not the adhesive failure of the bond between the foam and the pressure sensitive adhesive. As described above, it has long been recognized that it is particularly difficult to obtain an adequate bond strength between a silicone foam sheet and a pressure sensitive adhesive.

Another aspect of the above long-existing problem of inadequate bond strength of a pressure sensitive adhesive and silicone foam has been that of long term strength. In many prior laminates, the initial bond strength may have been acceptable when the laminate was first made, but after a few days or months, the bond strength has deteriorated to an unacceptable level.

We have found that a superior short-term and long-term strength bond between a silicone foam and a pressure sensitive adhesive can be obtained if the surface of the silicone foam sheet is properly prepared before the pressure sensitive adhesive is laminated to that surface. The surface preparation that is required before lamination however, depends on the properties or characteristics of the surface on which the pressure sensitive adhesive is to be laminated.

In one embodiment of this invention, we have now discovered that if the "cast side" of a cast silicone foam is used for lamination with the pressure sensitive adhesive instead of the "top side" of the silicone foam sheet, as conventionally used, an improved bond strength between the "cast side" of the cast silicone foam sheet and the pressure sensitive adhesive is obtained, provided that the "cast side" surface is first primed with a coating of curable urethane primer before laminating with the pressure sensitive adhesive.

The term "cast side" as used herein refers to the bottom side of the cast silicone foam sheet when it is made. Typically, when a cast silicone foam sheet is manufactured, the liquid silicone resin is deposited on a polyester or "Mylar" (Trademark of DuPont) type film on which the silicone elastomer foam is then cured. The cured silicone foam sheet then is rolled with the "Mylar" film remaining on the bottom or "cast side" of the cast silicone foam sheet. The "top side" of the silicone foam sheet, which is the top surface when the silicone foam sheet is manufactured, is typically pressed with a film or roll to obtain the proper thickness of the foamed sheet as it cures, which film or roll is then removed after some degree of curing of the silicone foam. Thus, the top side usually does not retain a film or other coating after the silicone foam sheet is cured or while in the roll.

The above discovery that the cast side of a silicone foam is useful in forming superior laminates with pressure sensitive adhesives is contrary to the conventional way in which cast silicone foam sheet has been laminated with the pressure sensitive adhesive. Previously the pressure sensitive adhesive has been applied to the "top side" of the cast silicone foam sheet. We have unexpectedly found that laminating the pressure sensitive adhesive to the "cast side" of the cast silicone foam sheet produces the desired bond strength, particularly long term bond strength, when first coated with the curable urethane primer.

We have also found that the top side of the silicone foam does not produce a satisfactory bond with a pressure sensitive adhesive, even when coated with the curable urethane primer. However, we have also discovered that the "top side" of the silicone foam can also be used to produce an improved bond to a pressure sensitive adhesive laminated thereon, provided that the top side surface is first treated and activated with a coating of a silicon-containing treating agent, then coated with the above curable urethane primer before the pressure sensitive adhesive is laminated onto the surface.

While the above discussion of the present invention is in terms of a cast silicone foam sheet, other types of silicone foam sheets, such as extruded silicone foam sheet and solid silicone rubber sheets, can be treated with the curable urethane primer, then laminated with a pressure sensitive adhesive to produce the desired superior bond strength between the extruded silicone foam sheet and the pressure sensitive adhesive. Likewise, we have found that other elastomeric materials, such as EPDM, PVC, perfluoroethylene, vinylidinefluoride and the like, either in foam or solid form of varying densities, can be treated with the curable urethane primer to obtain a superior bond between the surface thereof and a pressure sensitive adhesive. Other polymeric materials having a surface which is active, or can be made active as described herein, to the curable urethane primer and then bonded to the pressure sensitive adhesive are also within the scope of the present invention. Such polymeric materials, elastomeric materials and various polymer surfaces can be selected for use in the present invention in accordance with the disclosure herein.

In addition to the polymeric materials that are active to the curable urethane primer, polymeric materials which are not active to the curable urethane primer, are nevertheless made useful in the present invention by treating the surface thereof with a silicon-containing treating agent to convert the cured or inactive surface of such polymer to a surface which is active to the curable urethane primer, as described herein.

As used herein, "active surface" means a surface which is curable or reactive to the extent that it has sufficient active or reactive sites at the surface to react or bond with a curable urethane primer applied to the surface. One skilled in the art can readily determine whether a particular polymeric surface is active to a curable urethane primer selected for use in this invention. In this regard one preliminary indication or test useful in some instances is to coat the surface of the polymeric material with an organic solvent solution of the curable urethane primer selected for use on that surface. If the surface is not wetted by the primer solution, the surface is probably not active to that primer. If the organic solvent solution of the organic primer wets the surface, i.e., does not bead up, and continues to wet the surface while the solvent, such as toluene, evaporates, then the surface is likely active to the curable urethane primer. Those skilled in the art will have various tests and indications for determining if a polymeric surface is active to a curable urethane primer.

If a polymeric surface is not active or not sufficiently active to the curable urethane primer, it may be treated and activated so that it is sufficiently active to the urethane to the required extent. An inactive surface in some instances is a fully cured surface, and in other instances it simply lacks sufficient reactive or active sites at the surface for reacting with or bonding to the curable urethane primer to the desired degree when applied to the surface. Such polymeric surfaces can be activated routinely for use in the present invention by treatment with a silicon-containing treating agent as described herein. This treatment with the silicon treating agent converts such surfaces to active surfaces for the curable urethane primer.

We have found that in some cases, an active polymeric surface will become inactive in time due to exposure to moisture or oxygen in the ambient atmosphere. Some polymeric surfaces that are active and useful in this invention are those that have been covered air-tight or moisture-tight with a protective film, as illustrated by the cast side of a cast silicone foam. When the protective film is removed, the surface is active and can be used according to this invention with the curable urethane primer and the pressure sensitive adhesive. This is the method described above of using the active surface that is the "cast side" of the cast silicone foam sheets. It should be noted that such an active surface must be used with a given period of time after the protective film is removed, or the surface may become inactive to the curable urethane primer.

In one of its aspect, this invention involves the treatment of an inactive polymeric surface with a silicon-containing treating agent to make the surface active for use in this invention, then covering or sealing the activated surface with a protective film to preserve the surface activity. The protective film is not removed until the polymeric surface is ready for use with the curable urethane primer and pressure sensitive adhesive according to this invention. Alternatively in this aspect, the inactive polymeric surface is activated with the silicon-containing treating agent, then the activated surface is coated with the curable urethane primer. In this case the protective film is not needed, because the urethane primer coating has utilized and bonded to the activated surface, which then will not deteriorate significantly, even when the pressure sensitive adhesive is applied to the activated and primed surface at a later time.

The polymeric material or polymeric layer useful in the present invention, which has either the active or inactive surface may be, as noted above, silicone, EPDM, PVC, perfluoroethylene, vinylidinefluoride, or other polymeric materials. Various other polymeric materials having active or inactive surfaces useful in the present invention may include those disclosed in U.S. Pat. Nos. 2,882,183 to Bond et al.,; 4,031,120 to Gervase; 4,169,184 to Pufahl; and 4,356,676 to Hauptman, the disclosures of which are incorporated herein by reference. The polymeric materials useful in this invention are well-known and include many commercially available polymeric materials. One skilled in the art can readily select the appropriate and desired polymeric materials for use in the present invention following the description contained herein and by selecting the foam, elastomeric or other polymeric material having the properties appropriate to the end use intended for the final polymeric material/pressure sensitive adhesive laminate produced according to this invention.

One of the advantages of the present invention is that each of the components of the combinations comprising the systems described herein include many well-known materials, which are commercially available. Therefore, the components of the laminates of the present invention and the materials used in the methods of the present invention are described herein and illustrated in the examples herein so that one skilled in the art can select the various combinations materials for use in this invention to obtain the desired results for the particular product end use that may be desired for a particular product application.

The pressure sensitive adhesives useful in the present invention include the various pressure sensitive adhesives which are compatible with the curable urethane primer employed in the present invention and, to a lesser extent, compatible with the polymeric surface and with the silicon-containing treating agent used on inactive polymeric surfaces. They may be applied in liquid form but it is preferred to use solid pressure sensitive adhesives on a release paper so they can be simply laminated onto the polymeric surface. While preferred pressure sensitive adhesives include silicone pressure sensitive adhesives and acrylic pressure sensitive adhesives, other adhesives may be employed in the various systems and embodiments of the invention disclosed herein. Pressure sensitive adhesives which may be useful in the present invention include those disclosed in U.S. Pat. Nos. 4,169,184 to Pufahl; 4,196,254 to Puskadi; 4,232,489 to Carvington et al.; 4,356,676 to Hauptman; 4,726,982 to Traynor et al.; and 4,740,416 to DeCaster, Jr. et al., the disclosures of which are incorporated herein by reference. As with the other components of this invention, one skilled in the art can select the appropriate pressure sensitive adhesive for use in this invention according to the final properties desired in the polymeric material/pressure sensitive adhesive laminate product and the end use intended for the laminate.

The curable urethane primers useful in the present invention may be any curable urethane polymer which functions as a primer on the active polymeric surface useful in this invention and which is compatible with the adhesion of the pressure sensitive adhesive to the active polymeric surface. As will be recognized by one skilled in the art, the range of curable urethane primers may be quite diverse depending upon the particular pressure sensitive adhesive and the particular active polymeric surface selected for use in the present invention. In general, some curable urethane primers useful in the present invention are based on polyether moisture cure urethane systems, and others are based on polyester urethane systems, both of which are well-known in the art. Still other curable urethane primers useful in the present invention are the catalytically cured urethane systems, which are preferred in many instances because of their fast cure times that enable faster manufacturing processes. Examples of urethane primers useful in the present invention can be found in U.S. Pat. Nos. 3,707,521 and 3,779,794 to De Santis, the disclosures of which are incorporated herein by reference. Other groups of curable urethane polymers which may be useful as primers on various surfaces with various pressure sensitive adhesives according to the present invention are those disclosed in U.S. Pat. Nos. 4,031,120 to Gervase; 4,539,345 to Hansen; 4,687,533 to Rizk et al.; and 4,694,093 to Sugimori et al., the disclosures of which are incorporated herein by reference. As will be recognized by one skilled in the art, the particular curable urethane primer desired for a given combination of a particular polymeric surface and a particular pressure sensitive adhesive may readily be selected following the descriptions of the invention herein and particularly following the exemplary embodiments set forth herein.

One example of a curable urethane primer useful in this invention is a polyether urethane primer commercially available from Dow Corning Corporation, Midland, Mich. under the designation of "Urethane Bond". This particular curable urethane primer is found to be useful on the cast side of a silicone foam sheet in combination with acrylic pressure sensitive adhesives or with silicone pressure sensitive adhesives. This particular curable urethane primer is also especially useful in a similar combination where the top side of a cast silicone foam sheet is first activated with the silicon-containing treating agent as disclosed herein, then the curable urethane primer is applied to activated surface followed by application of the pressure sensitive adhesive layer.

The molecular weight and physical form of the curable urethane primer is not particularly important so long as the urethane primer is a curable polymer which can function as a primer in the system described by the present invention. The urethane primer can be of any desired molecular weight, and can be liquid or solid depending on the particular polymeric surface/pressure sensitive adhesive combination or system in which the primer is to be used. It will be generally desired in most systems to use the urethane primer in a liquid form and particularly in solvent solution for convenience of application and to insure a uniform coating of the urethane primer on the polymeric surface. For example, when using the above-mentioned "Urethane Bond", which is a liquid curable urethane primer, it is desirable to dilute the urethane primer with about equal parts of a solvent such as toluene, in order to enhance the uniformity of the urethane primer coating on the polymeric surface.

The curable urethane primer used can also be solid at ambient temperature, in which case it may be in powder form. If it is a powder, it is preferable that it be soluble or sufficiently dispersable in a solvent or carrier to assure uniformity of the curable urethane primer coating on the surface of the polymeric layer. In addition, a particularly useful and preferred solid curable urethane primer has been found to be a polyurethane sheet or film which can be laminated on the active polymeric surface with sufficient heat to cause the curable urethane primer sheet to soften or melt and flow on the polymeric surface and to bond to or react with the surface in much the same way as a liquid primer does. Examples of such urethane films are commercially available from Deerfield Urethane, Inc., South Deerfield, Mass., under the designations "PT6100S" and "PT9300" for polyether urethanes and "PT8010" for a polyester urethane. These curable urethane primer films have a thickness of about 0.002 in. to about 0.005 in. and will adequately melt or flow onto the polymeric surface at a temperature in the range of about 350° F. to about 400° F. A solid curable urethane primer in the form of a film or sheet has the advantages of a solventless handling system and provides a uniform primer coating on the polymeric surface. Another advantage may be realized with the solid sheet or film form of the curable urethane primer by first laminating the pressure sensitive adhesive to the curable urethane primer film or sheet, then laminating the urethane film or sheet to the polymeric surface.

In another aspect, using the solid curable urethane primer in film or sheet form provides an optional manufacturing method for producing the laminates of this invention. As described in the summary section above, a liquid polymer can be cast directly on the curable urethane sheet or film and allowed to cure to form the polymeric layer on the urethane sheet or film. Then the pressure sensitive adhesive can be laminated to the urethane primed surface of the polymeric material. For example, a silicone foam can be cast on the urethane film or sheet (e.g., see U.S. Pat. No. 4,728,567 to Razzano, et al.) in liquid form and cured thereon to form the silicone foam. This can also be done on one side of the curable urethane primer sheet or film that already has the pressure sensitive adhesive laminated to the other side.

In regard to the solid form of the urethane primer useful herein, whether in the form of a powder, sheet or film, it should be noted that the curable urethane primer can be partially cured, stable and storable at ambient temperatures, but is curable for purposes of this invention in that it will advance in cure at elevated temperatures. Such solid urethane primer is thereby useful in the present invention because it is curable at the elevated temperature at which it is applied to the polymeric surface and because it bonds to or reacts with the surface when applied at the elevated temperature.

The silicon-containing treating agents useful in the present invention are those compounds which contain a silicon atom bonded to carbon and/or oxygen, and which may contain organic radicals sufficient to characterize them as organosilane or organosiloxane compounds. These silicon-containing treating agents are used to activate a cured or inactive polymeric surface to convert the surface to a surface which is active to react with or bond with the curable urethane primer described above for use in this invention. Some surfaces of the polymeric materials useful in this invention will be activated more easily than others. For example, a silicon treating agent useful in the present invention to activate the top side of a cast silicone foam sheet or either side of an extruded silicone foam sheet is a room temperature curing silicon primer commercially available from Dow Corning, Midland, Mich., under the designation of "Dow Corning $R_{1200}$". On other surfaces, such as some extruded silicone foam sheets, it may be desirable to use a silicon-containing treating agent which is a two-part RTV silicone rubber system.

Silicon treating agents useful in the present invention are well-known in the art for coating surfaces as primers or to impart adhesive properties to various surfaces. For example, silicon-containing compounds which may be useful as silicon treating agents in the present invention are disclosed in U.S. Pat. Nos. 3,453,136 to Bylma; 3,453,243 to Hartlein; 3,502,704 to McKellar; 3,624,022 to Ross; 4,031,120 to Gervase; 4,539,345 to Hansen; 4,681,80 to Lefler; and 4,694,093 to Sugimori, et al., the disclosures of which are incorporated herein by reference. The particular silicon treating agent for a particular surface treatment may be selected by one skilled in the art following the disclosure herein and will depend on the properties of the polymeric surface being treated and the particular urethane primer to be applied to the treated or activated polymeric surface.

When a cured, non-reactive or inactive polymeric surface is activated with a silicon-treating agent, it has been found that a preferred method is to apply the silicon treating agent to the polymeric surface, then cover the treated surface with a protective film such as a polyester or "Mylar" type film and allow the silicon treating agent to remain on the treated surface and at least partially cure or react under the protective film. After the silicon treating agent has cured or reacted to the desired degree, the protective film is removed similar to removing a release paper. Then the curable urethane primer is applied to the polymeric surface which has been activated by the silicon treating agent.

While it is difficult to define what affect the time delay has on the active surface after the Mylar film is removed, it has been observed when using cast silicone foam sheet that after the film is removed, if the surface is not immediately coated with the curable urethane primer, maximum bond strength may not be achieved. Thus, it is generally preferred to coat the surface with the curable urethane primer as soon as practical after the surface of elastomeric sheet is prepared and/or activated with the silicon treating agent, such as within 6 hours, preferably within 4 hours, and more preferably within about 3 hours, and most preferably immediately. Therefore, removal of the Mylar polyester film from the cast side of a cast foam sheet should be considered part of the surface preparation, i.e., the surface should be exposed by removing the film, primed with the curable urethane primer and laminated with the pressure sensitive adhesive within a reasonable amount of time to obtain optimum bond strength.

In the present invention, the activation of a cured or inactive polymeric surface with the silicon treating agent may be carried out at room temperature, but may also be carried out at elevated temperatures to accelerate the rate of curing or to accomplish a particular desired degree of curing. Likewise the application of the curable urethane primer to an active or activated polymeric surface may be done at room temperature, but elevated temperatures may be desirable to accomplish a desired degree of curing before the pressure sensitive adhesive is laminated onto the surface. In general, it is desired that the curable urethane primer essentially be fully cured, before the pressure sensitive adhesive is laminated to the polymeric surface. However, it has been found that it is preferred to apply the pressure sensitive adhesive to the cured urethane primer coating before heat aging the urethane primer coating.

Also in carrying out the present invention, the temperature at which the pressure sensitive adhesive is laminated to the primed polymeric surface is not critical, but elevated temperatures can be used to enhance the bond strength in some cases. It is generally preferred to apply the pressure sensitive adhesive to the polymeric surface in a reasonably short amount of time after the surface is coated with the urethane primer. While it is difficult to define what effect time delay has on the polymeric surface-to-pressure sensitive adhesive bond strength, it has been observed that in some cases this bond strength may be less than maximum if the urethane-primed surface is allowed to remain a long period of time, such as three or four months, before laminating with the pressure sensitive adhesive.

We have also found that on some elastomeric sheet surfaces, such as an extruded silicone foam sheet with a rough surface finish, additional components and steps are desired in order to achieve the maximum bond strength between the elastomeric sheet and the pressure sensitive adhesive. For example, on such difficult surfaces, it has been found to be particularly effective to prime the surface with a conventional silicone rubber, such as an RTV silicone rubber system typically used in the conventional two part systems for making silicone rubber molds. An example of such silicone rubber system is the "Silastic HSRTV" silicone mold rubber molding compound available from Dow Corning. Immediately after the elastomer sheet surface is coated with a mixture of the two parts of the silicone rubber system, the surface is covered with a protective "Mylar" type polyester film. After this coating of silicon treating agent has cured, usually about 24 hours, the protective film is then removed to expose the activated surface. The activated surface is then further coated with the curable urethane primer as described herein, then laminated with the pressure sensitive adhesive layer. Following this procedure, it has been found that a superior bond between the elastomer sheet and the pressure sensitive adhesive can be obtained even on the elastomeric sheet surfaces like the top side of a cast silicone foam or either surface of an extruded silicone foam, which are extremely difficult to bond a pressure sensitive adhesive to.

Having described this invention in the above terms to enable one skilled in the art to practice this invention, the invention is now further illustrated by the following illustrative examples which are to be considered specific embodiments of the present invention without indication as to the scope of this invention which is defined by the appended claims.

EXAMPLE I

This example illustrates the improved bond which can be obtained between a pressure sensitive adhesive laminated on a silicone foam sheet using the various aspects of this invention. In this example, the silicone foam sheet used was Bisco HT-800 which has a density of 22 lb/ft$^3$ and is a closed-cell silicone sponge. The sheet used was ⅛ inch thick, cut in strips 3 inches by 6 inches. The Bisco HT-800 is a cast foam which is cast on a polyester "Mylar" sheet. This polyester sheet was removed from the cast side of the foam and a curable urethane primer, identified as "Urethane Bond" and commercially available from Dow Corning, Midland, Mich., thinned with an equal weight of toluene, was coated on to the cast side of the silicone foam. After 24 hr. at 78° F. an acrylic pressure sensitive adhesive was laminated to the urethane primed surface of the silicone foam. The pressure sensitive adhesive used was "Mactac 1F 2012 Acrylic PSA" available from Morgan Adhesives Company, Stow, Ohio, which was 0.002 in. thick on a release paper. The lamination was done on a roll laminator at 0.5 ft/sec and a pressure of about 25 psi. A 0.5 in. wide strip of each sample was then tested. Each sample was tested in a 180° peel test on clean glass at 12 inches per minute peel rate. Dwell time between applying the strip to the glass an running the test is 1 minute, unless otherwise noted. The results were as follows:

| Silicone Sponge Surface | Peel Strength oz./in. width |
| --- | --- |
| Top side (no primer) | 1 |
| Cast side (no primer) | 5 |
| Top side (with curable urethane primer) | 1 |
| Cast side (with curable urethane primer) | >34* |

*The foam tore during the peel test.

This Example I demonstrates that the top side of the cast silicone sponge is not an active surface to the curable urethane primer, whereas the cast side is an active polymeric surface to the curable urethane primer. In addition, this Example shows the effectiveness of the urethane primer.

EXAMPLE II

In this Example the top side of the same Bisco HT800 silicone sponge as in Example I was coated with Dow Corning® 1200 silicone primer, and allowed to dry for ½ hour. The treated surface was coated with Urethane Bond, then coated with the same curable urethane primer as in Example I and then cured in an oven at 110° C. for 1 hour, after allowing enough moisture to absorb into the top surface to start the curing reaction. A test strip of this primed material was laminated with "9485 Acrylic PSA" from 3M Company, St. Paul, Minn., then affixed to a glass test platten. The test sample was allowed 1 hour of dwell time to allow the acrylic PSA to achieve near maximum bond strength to the glass. When peel tested as in Example I the strip reached a maximum of 108 oz./in. width, and the silicone sponge tore before the end of the test, but the PSA did not release from the surface of the silicone sponge.

This Example illustrates the conversion of the top side surface, shown to be inactive to the curable urethane primer in Example II, to an active surface on which the curable urethane primer and PSA produces a superior bond.

EXAMPLE III

In this Example the polymeric material used was "SF1101M Silicone Sponge", an extruded, grey silicone foam, ⅛ in. thick, with a rough surface, available from SFS Corporation, Santa Fe Springs, Calif. The acrylic PSA used was the same as in Example I.

Four samples were tested with and without the "Urethane Bond" (Dow Corning) curable urethane primer on each side of the silicone foam. A fifth sample was prepared by treating the surface first with a silicon-containing treating agent, then with the curable urethane primer, then laminating the PSA on the surface. The silicon treating agent was "Silastic® HSRTV" (Dow Corning), a two-part silicone rubber composition. The two parts were mixed, then coated on the surface, covered with a polyester protective film and allowed to cure overnight. The protective film was removed and the urethane primer was then coated on the surface and again allowed to cure overnight. The PSA was then laminated to the surface. The samples were tested on the peel test of Example I (1 minute dwell time) with the following results:

| Sample | Surface | Peel Strength oz./in. width |
| --- | --- | --- |
| 1 | Side 1, no primer | <1 |
| 2 | Side 2, no primer | <1 |
| 3 | Side 1, with urethane primer | <1 |
| 4 | Side 2, with urethane primer | <1 |
| 5 | Side 1, with silicon treating agent and urethane primer | 26 |

EXAMPLE IV

Two samples above of Bisco HT-800 silcone foam were prepared for lamination of a PSA on the "cast side" by removing the Mylar film from the cast side. One sample was coated with "GE SR500 Silicone Primer", from General Electric Company, which is a moisture activated silicone compound. The second sample was coated with a urethane primer made by mixing equal parts by weight of the above "Urethane Bond" (Dow Corning) and toluene. The two primers were allowed to cure on the surface and then were laminated with a "Y9732 Silicone Pressure Sensitive Adhesive" (3M Company). Each sample was tested on the peel test of Example I (1 minute dwell time), at the following times with the following results:

| | Peel strength, oz./in. width | | |
| --- | --- | --- | --- |
| Time after lamination: | 10 min. | 24 hr. | 6 mo. |
| Sample 1: Silicone primer | 26 | 10 | 10 |
| Sample 2: Urethane primer | 26 | 26 | 26 |

This example illustrates the conventional degradation of peel strength of silicone PSA on silicone foam, even with a silicone primer, and also illustrates the superior bond strength provided by this invention.

We claim:

1. A method of forming a laminate comprising a polymeric layer and a pressure sensitive adhesive comprising:
   a) casting a liquid resin selected from the group consisting of monomers which produce silicone, EPDM, PVC, perfluoroethylene and vinylidine fluoride elastomeric materials on a protective film;
   b) curing said monomers;
   c) removing said protective film to expose an active surface wherein said active surface is the surface previously in contact with said protective film;
   d) applying a curable urethane primer to said active surface; and
   e) applying a pressure sensitive adhesive to said primed surface.

2. The method of claim 1 wherein the polymeric layer is an elastomeric sheet.

3. The method of claim 1 the pressure sensitive adhesive is a silicone adhesive or an acrylic adhesive.

4. The method of claim 1 wherein the elastomeric sheet is a silicone foam.

5. A method of forming a laminate comprising a polymeric layer and a pressure sensitive adhesive comprising:
   a) obtaining a polymer sheet with a protective film on one surface of the sheet wherein the sheet is formed by casting a liquid resin selected from the group consisting of monomers which produce silicone, EPDM, PVC, perfluoroethylene and vinylidine fluoride elastomeric materials on a protective film and curing said monomers;
   b) removing said protective film to expose an active surface wherein said active surface is the surface previously in contact with said protective film;
   d) applying a curable urethane primer to said active surface; and
   e) applying a pressure sensitive adhesive to said primed surface.

6. The method of claim 5 wherein the polymeric layer is an elastomeric sheet.

7. The method of claim 5 the pressure sensitive adhesive is a silicone adhesive or an acrylic adhesive.

8. The method of claim 5 wherein the elastomeric sheet is a silicone foam.

9. A laminate formed by:
   a) casting a liquid resin selected from the group consisting of monomers which produce silicone, EPDM, PVC, perfluoroethylene and vinylidine fluoride elastomeric materials on a protective film;
   b) curing said monomers;

c) removing said protective film to expose an active surface wherein said active surface is the surface previously in contact with said protective film;

d) applying a curable urethane primer to said active surface; and e) applying a pressure sensitive adhesive to said primed surface.

10. The method of claim 9 wherein the polymeric layer is an elastomeric sheet.

11. The method of claim 9 the pressure sensitive adhesive is a silicone adhesive or an acrylic adhesive.

12. The method of claim 9 wherein the elastomeric sheet is a silicone foam.

* * * * *